United States Patent
Hann et al.

(10) Patent No.: US 12,554,963 B2
(45) Date of Patent: Feb. 17, 2026

(54) METHOD AND APPARATUS FOR QUALITY PREDICTION

(71) Applicant: Oxford University Innovation Limited, Oxford (GB)

(72) Inventors: Evan Hann, Oxford (GB); Stefan Piechnik, Oxford (GB); Iulia Andreia Popescu, Oxford (GB); Qiang Zhang, Oxford (GB); Konrad Werys, Oxford (GB); Vanessa Ferreira, Oxford (GB)

(73) Assignee: OXFORD UNIVERSITY INNOVATION LIMITED, Oxford (GB)

( * ) Notice: Subject to any disclaimer, the term of this patent is extended or adjusted under 35 U.S.C. 154(b) by 345 days.

(21) Appl. No.: 17/428,392

(22) PCT Filed: Feb. 4, 2020

(86) PCT No.: PCT/GB2020/050249
§ 371 (c)(1),
(2) Date: Aug. 4, 2021

(87) PCT Pub. No.: WO2020/161481
PCT Pub. Date: Aug. 13, 2020

(65) Prior Publication Data
US 2022/0121902 A1    Apr. 21, 2022

(30) Foreign Application Priority Data

Feb. 6, 2019 (GB) .................................... 1901632
Sep. 9, 2019 (GB) .................................... 1912960

(51) Int. Cl.
*G06N 3/04* (2023.01)
*G06F 18/241* (2023.01)
(Continued)

(52) U.S. Cl.
CPC ............. *G06N 3/04* (2013.01); *G06F 18/241* (2023.01); *G06N 3/08* (2013.01); *G06T 3/4046* (2013.01)

(58) Field of Classification Search
CPC . G06N 3/04; G06N 3/08; G06N 3/045; G06F 18/241; G06T 3/4046
See application file for complete search history.

(56) References Cited

U.S. PATENT DOCUMENTS

| 11,657,222 B1 * | 5/2023 | Anthony ............... G06F 40/279 706/12 |
| 2003/0100299 A1 * | 5/2003 | Ko ........................ H04W 24/00 455/423 |

(Continued)

FOREIGN PATENT DOCUMENTS

| EP | 3961515 A2 * | 3/2022 | ............. G06N 3/045 |
| WO | 2018/052586 A1 | 3/2018 | |

OTHER PUBLICATIONS

International Search Report and Written Opinion for WO 2020/161481 (PCT/GB2020/050249), dated May 20, 2020, pp. 1-18.
(Continued)

*Primary Examiner* — Charles T Shedrick
(74) *Attorney, Agent, or Firm* — Thomas | Horstemeyer, LLP (57) ABSTRACT

A method of selecting an operation for analysis of data, the method comprising: processing the data using at least two operations, wherein each of the at least two operations are different, to obtain a set of outputs including the output associated with each operation; determining an output from the set of outputs with the highest predicted accuracy; and selecting the operation associated with the determined output for further analysis of data; wherein the determination of the output with the highest predicted accuracy comprises: selecting an output from the set of outputs; calculating a
(Continued)

degree of similarity between the selected output and another output of the set of outputs; using the degree of similarity to predict the accuracy of the selected output based on a relationship between the similarity of the outputs and the accuracy of the outputs, the relationship being derived from an analysis of the degrees of similarity between the outputs of the operations on training data including ground truth and the accuracy of each output compared to the ground truth; selecting a further output from the set of outputs; calculating a further degree of similarity between the selected further output and another output of the set of outputs; using the further degree of similarity to predict the accuracy of the further selected output based on the relationship; and determining the output with the highest predicted accuracy of the selected outputs.

21 Claims, 9 Drawing Sheets

(51) Int. Cl.
*G06N 3/08* (2023.01)
*G06T 3/4046* (2024.01)

(56) References Cited

U.S. PATENT DOCUMENTS

| | | | | |
|---|---|---|---|---|
| 2012/0284213 | A1* | 11/2012 | Lin | G06N 20/00 714/E11.02 |
| 2018/0225569 | A1* | 8/2018 | Tommy | G06F 16/51 |
| 2019/0244357 | A1* | 8/2019 | El Harouni | G06T 7/194 |
| 2020/0075019 | A1* | 3/2020 | Steelberg | G10L 15/32 |
| 2020/0175350 | A1* | 6/2020 | Kursun | G06N 3/086 |
| 2022/0121902 | A1* | 4/2022 | Hann | G06F 18/241 |

OTHER PUBLICATIONS

UK Search Report for GB 1901632.8, dated Aug. 7, 2019, pp. 1-6.
International Preliminary Report on Patentability for WO 2020/161481 (PCT/GB2020/050249), dated Aug. 10, 2021, pp. 1-14.
Hongwei Li et al: "Fully Convolutional Network Ensembles for White Matter Hyperintensities Segmentation in MR Images", arxiv.org, Cornell University Library, 201 Olin Library Cornell University Ithaca, NY 14853, Feb. 14, 2018 (Feb. 14, 2018).
Hao Zheng et al: "A New Ensemble Learning Framework for 3D Biomedical Image Segmentation", arxiv.org, Cornell University Library, 201 Olin Library Cornell University Ithaca, NY 14853, Dec. 10, 2018 (Dec. 10, 2018).
Hann Evan et al: "Quality Control-Driven Image Segmentation Towards Reliable Automatic Image Analysis in Large-Scale Cardiovascular Magnetic Resonance Aortic Cine Imaging", Oct. 10, 2019 (Oct. 10, 2019), 12th European Conference on Computer Vision, ECCV 2012; [Lecture Notes in Computer Science], Springer Berlin Heidelberg, Berlin, Heidelberg, pp. 750-758.
Ezequiel De La Rosa et al: "Myocardial Infarction Quantification From Late Gadolinium Enhancement MRI Using Top-hat Transforms and Neural Networks", arxiv.org, Cornell University Library, 201 Olin Library Cornell University Ithaca, NY 14853, Jan. 9, 2019 (Jan. 9, 2019).
Jelmer M Wolterink et al: "Automatic Segmentation and Disease Classification Using Cardiac Cine MR Images", arxiv.org, Cornell University Library, 201 Olin Library Cornell University Ithaca, NY 14853, Aug. 3, 2017 (Aug. 3, 2017).
Shuangling Wang et al: "Hierarchical retinal blood vessel segmentation based on feature and ensemble learning", Neurocomputing, vol. 149, Feb. 1, 2015 (Feb. 1, 2015), pp. 708-717.
Wu Yicheng et al: "Deep Classification and Segmentation Model for Vessel Extraction in Retinal Images", Nov. 2, 2018 (Nov. 2, 2018), Robocup 2008: Robocup 2008: Robot Soccer World Cup XII; [Lecture Notes in Computer Science; Lect.Notes Computer], Springer International Publishing, Cham, pp. 250-258.
Ronneberger et al, U-Net: Convolutional Networks for Biomedical Image Segmentation (arXiv:1505.04597v1 [cs.CV] May 18, 2015).
Kohlberger et al, "Evaluating Segmentation Error Without Ground Truth", MICCAI 2012: Medical Image Computing and Computer-Assisted Intervention—MICCAI 2012 pp. 528-536.
Robinson et al, "Automatic Quality Control of Cardiac MRI Segmentation in Large-Scale Population Imaging", MICCAI 2017: Medical Image Computing and Computer Assisted Intervention—MICCAI 2017 pp. 720-727.
Robinson et al., "Subject-level Prediction of Segmentation Failure Using Real-Time Convolutional Neural Nets", Apr. 10, 2018 MIDL 2018 Abstract Submission.
Roy et al., "Inherent Brain Segmentation Quality Control From Fully ConvNet Monte Carlo Sampling", Medical Image Computing and Computer Assisted Intervention—MICCAI 2018. MICCAI 2018. Lecture Notes in Computer Science, vol. 11070. Springer, Cham.
Valindria et al., "Reverse Classification Accuracy: Predicting Segmentation Performance in the Absence of Ground Truth", IEEE Transactions on Medical Imaging, vol. 36, No. 8, pp. 1597-1606, Aug. 2017, doi: 10.1109/TMI.2017.2665165.
Lakshminarayanan et al., "Simple and Scalable Predictive Uncertainty Estimation using Deep Ensembles", Advances in Neural Information Processing Systems 30 (NIPS 2017).
European Examination Report for Patent Application No. 20 705 469.3, dated May 26, 2025, pp. 1-12.
Platanios Emmanouil A et al: "Estimating Accuracy from Unlabeled Data", Uncertainty in Artificial Intelligence, Jul. 23, 2014 (Jul. 23, 2014), pp. 1-10, XP093278822.

* cited by examiner

METHOD AND APPARATUS FOR QUALITY PREDICTION

CROSS-REFERENCE TO RELATED APPLICATIONS

This application is the National Stage of International Application No. PCT/GB2020/050249, filed Feb. 4, 2020, which claims priority to GB 1901632.8, filed Feb. 6, 2019 and GB 1912960.0, filed Sep. 9, 2019, which are entirely incorporated herein by reference.

The present invention relates to the computer-implemented automatic interpretation of data by systems and the prediction of the accuracy of the interpretation.

The need to interpret large amounts of data arises in many technological fields. For example, in the medical field, during diagnostic procedures or patient monitoring, images (such as x-ray, MRI, PET and so on) and other data will be generated that are associated with a patient. Other examples of fields in which large amounts of data are generated for interpretation include image and ranging information generated during the operation of a vehicle, such as images of the surroundings obtained using cameras or light detection and ranging (LIDAR) or other sensor data.

Processing of the data is necessary to interpret it, i.e. to extract useful information that can then be used. For example, in the case of an x-ray or MRI image, analysis of the image may produce a result that provides a particular diagnosis and/or suggests that a particular treatment should be used. Often, multiple images of varying contrast may be used together with information in other formats including, for example, clinical records, age and gender. In the case of images of the surroundings obtained during operation of a vehicle, analysis of the entirety of such multi-format data may be used to assist guidance of the vehicle, for example that causes a controller of the vehicle to take evasive action to avoid a collision with an object identified in the image. Single input approaches are subject to errors, such as malfunction, and artefacts and thus combining information from multiple inputs (e.g. different camera views, or visible/ infrared day/night vision) and sensors improves the performance of such approaches.

Many systems have been developed for automated analysis of data to cope with the need for analysis of large amounts of data in a required amount of time. To perform automated analysis, the data is provided as an input to a data processing system, a number of data processing operations are performed on the data and an output is provided. Artificial intelligence in the form of machine learning is particularly useful for the automated interpretation of complex and/or large data sets where it is difficult or impossible to establish a priori an analytic relationship between the input data and the appropriate output. For example, one form of artificial intelligence, the artificial neural network (ANN), is widely known which can be optimised (sometimes described as trained) to interpret data such as images, music or text. Such machine learning typically involves a training process in which the ANN is provided with a training data set, which includes a body of input data sets and the desired output (ground truth) for each input, and its data processing parameters are modified until it achieves a desired level of agreement with the ground truth. The trained ANN can then be used to analyse and output interpretations of new data sets. The final process performed by the ANN depends both on the initial architecture (e.g. type of units, layer sizes and numbers, scope of allowed connection complexity) and multiple aspects of ANN optimisation process itself (the volume, scope and quality of the data available and technical rules and coefficients chosen to perform the optimisation), An estimate of the accuracy of the interpretation may be important if the output of the analysis will subsequently be used in a critical application, such as diagnosing a patient or taking action to prevent a vehicle accident. An individual ANN can provide measures of confidence but given the sources of variability explained above it may be problematic to rely on a single machine, as it would be to rely on a single medical expert with a life-changing decision in the case of a difficult case to diagnose or unusual scenario.

This problem is routinely solved in clinical diagnosis by referring to a traditional second or further individual expert opinions or calling for a multidisciplinary team (MDT). The latter utilises different experience and backgrounds for decision makers to achieve a joint specialist unanimous decision. While a multidisciplinary clinical team usually involve experts from related fields (medics, experienced nurses, biomedical scientists, etc) consensus is reached with informal information exchange within the group and the most critical result is the diagnosis, while the measures of disagreement are rarely recorded or used.

It has also been found that increasing the processing power of the data analysis system does not necessarily increase the reliability of the results as it can result in the system overfitting the data—i.e. learning individual solutions, rather than the general method, which may result in identifying patterns or classes that may lead to undesired interpretation, or simply getting the wrong result.

It can therefore be seen that there is a desire for a method of automatically analysing data using machine learning which not only provides an optimised result but also provides the optimised accurate estimate of the accuracy of the primary result.

According to a first aspect there is provided a method of selecting an operation for analysis of data, the method comprising: processing the data using at least two operations, wherein each of the at least two operations are different, to obtain a set of outputs including the output associated with each operation; determining an output from the set of outputs with the highest predicted accuracy; and selecting the operation associated with the determined output for further analysis of data; wherein the determination of the output with the highest predicted accuracy comprises: selecting an output from the set of outputs; calculating a degree of similarity between the selected output and another output of the set of outputs; using the degree of similarity to predict the accuracy of the selected output based on a relationship between the similarity of the outputs and the accuracy of the outputs, the relationship being derived from an analysis of the degrees of similarity between the outputs of the operations on training data including ground truth and the accuracy of each output compared to the ground truth; selecting a further output from the set of outputs; calculating a further degree of similarity between the selected further output another output of the set of outputs; using the further degree of similarity to predict the accuracy of the further selected output based on the relationship; and determining the output with the highest predicted accuracy of the selected outputs.

An operation can be any data processing operation such as an analytic function, a true or false indicator, a multiplication or convolution, or a more complex analysis such as the analysis performed by a neural network. The data may be any information that may be stored on a computer, such as image, text or speech or sensor data, for example.

Training data may be a data set for which the ground truth of the data is known and additionally included in the data set. The ground truth may therefore be used to determine the accuracy of an output produced by the data processing operation on the data by comparing the output to the ground truth.

Training data may alternatively or additionally be used to improve the accuracy of the output produced by the operation. In this case, the operation may be performed on the data set multiple times, and the parameters of the operation are varied to improve the accuracy of any of the desired outputs produced by the operation. The variation may be manual in an optimisation of the data processing operation, or part of an automatic training process in a machine learning application.

Optionally, the method may further comprise obtaining a combined output by combining at least two of the outputs associated with each operation; wherein the combined output is additionally included in the set of outputs.

A combined output may be data including information from both sets of data used to produce the combined output. The quantity of data in the combined output may be the same as either one of the inputs used to form the combined output. In the case of image data, the size of the output image may be the same as the size of an input image.

Optionally, the relationship may be a regression model or a classification model obtained by comparing the degree of similarity of the selected output and the other output of the set of outputs obtained for the set of training data to the degree of similarity of the selected output and ground truth in the training data.

A regression model is a continuous data-processing model indicating the relationship between different variables. One example of a regression model is a linear regression model in which the relationship is defined by two parameters of the model. A further example is a polynomial regression model, where the relationship is defined by any number of parameters. A classification model is a discrete data-processing model indicating the relationship between different variables and sets. A classification model may indicate to which set an input belongs based on variables associated with the input. Optionally, the degree of similarity may be obtained using a Dice similarity coefficient (DSC).

Optionally, the difference between each of the at least two operations may be predetermined.

The difference between the operations being predetermined may mean that the differences are not selected at random. The predetermined differences may have been selected based on the data set to be analysed.

Optionally, at least one of the at least two operations may be optimised for analysis of an image.

Optionally, at least one of the at least two operations may be performed by a fully convolutional neural network.

Optionally, at least two of the at least two operations may be performed by neural networks and the neural networks differ by at least one of: their number of layers, their hyper-parameters, their parameters, their number of parameters, the data used to train them.

Optionally, the method may further comprise analysing further data using the selected operation.

The further data may be of a similar type to the training data. The further data may not have been included in the training data.

Optionally, when the output with the highest predicted accuracy is a combined output, the selected operation may be a combination of the set of operations associated with the combined output.

Optionally, the method may further comprise analysing further data, wherein the method of the first aspect is performed on the further data to determine a further selected operation and the further data is analysed using the further selected operation. Such a dynamic process may be in contrast to the process of analysing further data only using the preselected operation as discussed above.

Optionally, the data may be in the form of an image.

Optionally, the output of each operation may be a segmentation of the image.

Optionally, in the case of a combined output, segmentation of each pixel of the image may be determined depending on the agreement of, for the respective pixel, a threshold number of the outputs comprising the combined output.

Optionally, the analysis may determine the shape of a section of a human body recorded in the image.

Optionally, the section of the human body may be the left ventricular myocardium.

Optionally, the method may further comprise alerting an operator if the highest predicted accuracy drops below a predetermined threshold.

In a second aspect there is provided an data analysis device, comprising an analyser configured to perform the method of the first aspect on the provided data.

In a third aspect there is provided a computer program comprising code means that when executed by a computer system, instruct the computer system to perform the method of the first aspect.

In a fourth aspect there is provided a computer system for selecting an operator for analysis of data, the system comprising at least one processor and memory, the memory storing code that performs the method of the first aspect.

Embodiments will now be described by way of example only, with reference to the figures in which.

Figure 1A:
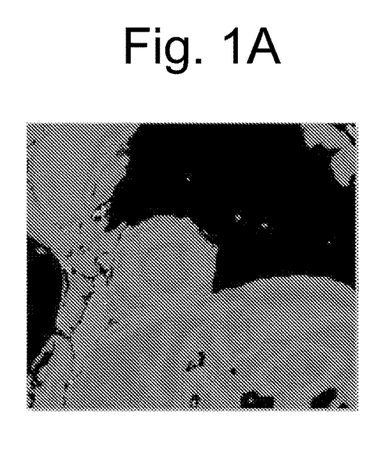
FIGS. 1a and 1b are an example of an image and a segmented output corresponding to the image.
Figure 1B:
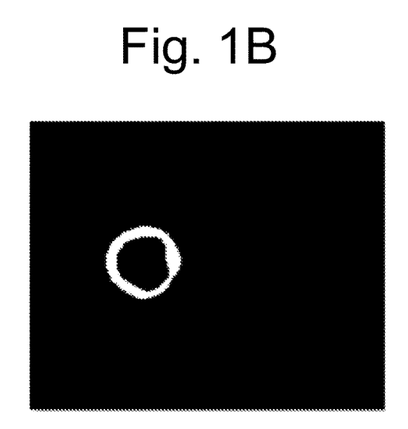

FIG. 1 shows an example of segmentation of an image with the original image in FIG. 1A and the result of interpretation (the segmentation) in FIG. 1B. In a segmentation process, areas of an image are identified and assigned to one class or another depending on whether the area is determined to belong to a particular feature of interest within the image. This may be done pixel-wise (i.e. pixel by pixel) or on larger areas. In the example shown in FIG. 1, pixels of the image found to be associated with the feature of interest have been assigned a value of one (displayed white in FIG. 1B) and pixels found not to be associated with the feature of interest have been assigned a value of zero (displayed black in FIG. 1B). The segmentation process may allow the identified feature of interest to be used for further analysis step. The image before segmentation has been applied may be considered input data and the segmented image may be considered the output in this example.

In the example shown in FIG. 1, the segmentation process is being performed to identify the left ventricular myocardium, a section of the wall of the heart, in a cardiac MRI quantitative T1 map. FIG. 1A shows a section of the heart of obtained using MRI T1 imaging with the T1 values displayed as different colours. The left ventricular myocardium is an example of a feature of interest that, when identified in the image, may have useful further applications in allowing the diagnosis of various heart conditions.

FIG. 1B shows the output obtained after a segmentation process has been applied to the image. The segmented image isolates the shape of the left ventricular myocardium feature and allows the shape to clearly be seen. Diagnoses of various problems may be performed based on the determined shape.

Such a segmentation process may be applied to other sorts of images to determine a feature of interest. For example, also in medical imaging, segmentation processes may be applied to determine the shape and/or position of other features in the heart, the shape of the heart or other organs such as the kidneys, or any other part of the human body. In other imaging fields segmentation may be applied to images such as views of rooms or street scenes, to isolate particular features such as people or potential obstacles. Further analysis of such features may use the obtained shape of the feature, in combination with other information, to determine what features are present within the image, for example by assigning semantic information to areas within the image.

Figure 2A:
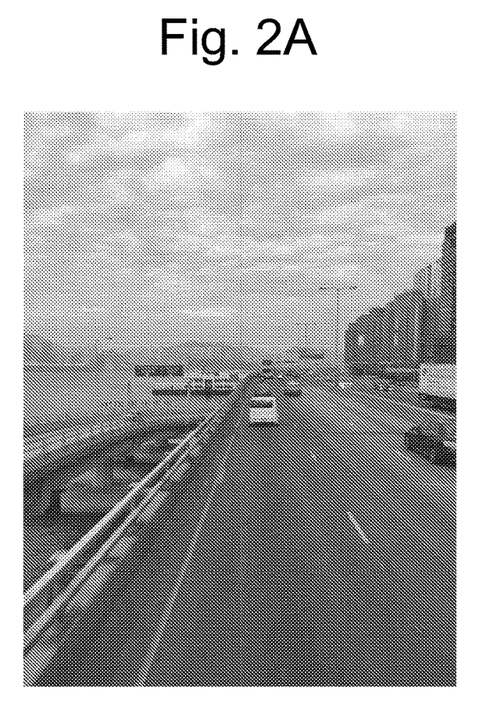
FIGS. 2a and 2b are a further example of an image and a segmented output corresponding to the image.

FIG. 2 shows an example of a segmentation process being performed on an input obtained by a self-driving vehicle. FIG. 2A shows the input image on which the segmentation process is to be performed to identify multiple features of interest that may be relevant to navigation such as roads, vehicles, obstacles, rails, people and the background, for example.

Figure 2B:
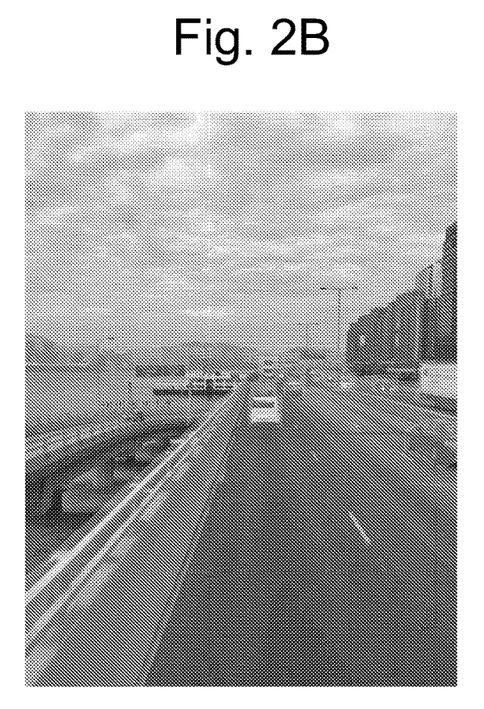

FIG. 2B shows the output obtained after a segmentation process has been applied to the input image of FIG. 2A. The segmented image isolates different structures of interest in the image.

The segmentation processes described above are an example of an analysis or interpretation that may be performed on a data set. In the examples discussed above, the image is the data to be analysed and the segmentation process is the analysis to be performed. However, analysis may be performed on other data such as music or text data and other data obtained from sensors.

Figure 3:
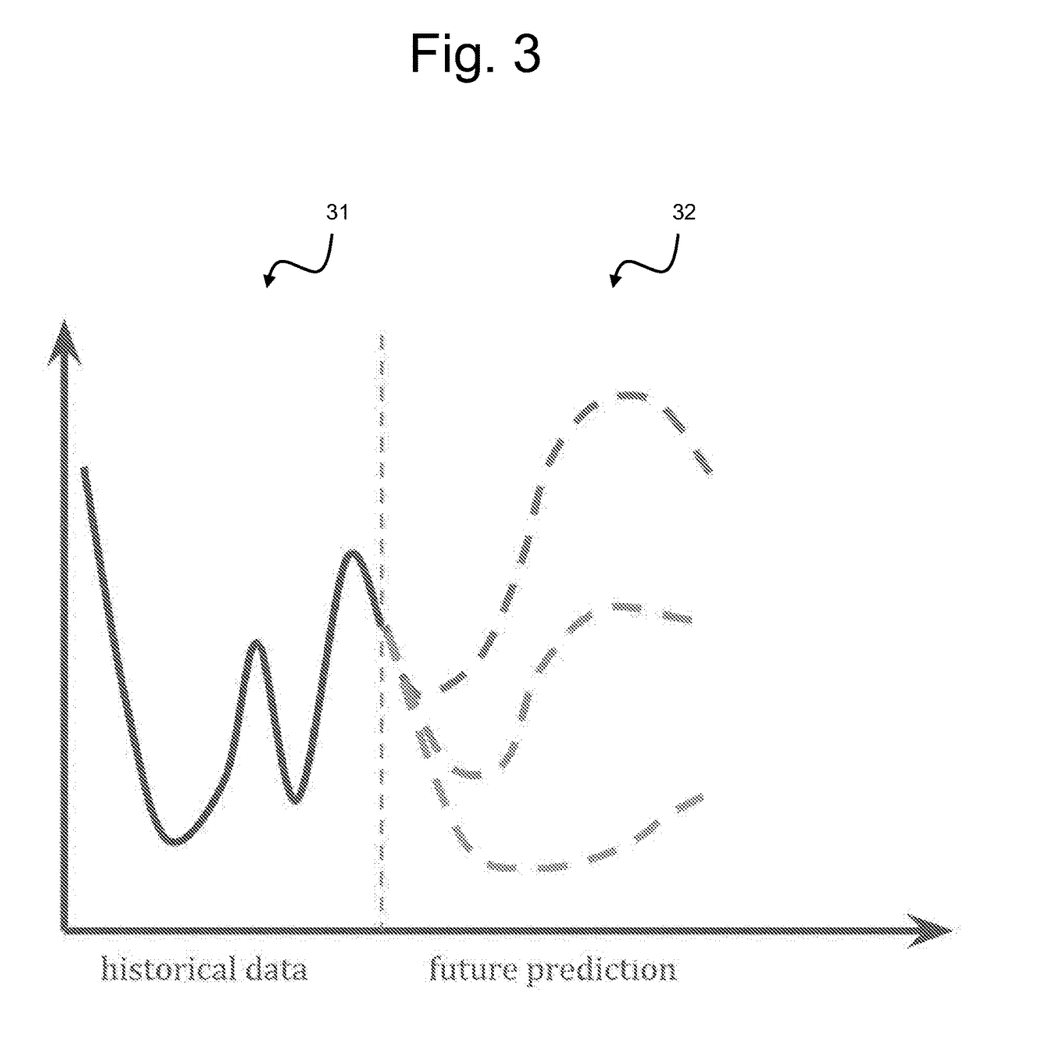
FIG. 3 is an example graph illustrating data obtained by a sensor and potential predictions of the future data that will be recorded.

For example, FIG. 3 shows sensor data that may have been obtained from a system. Examples of such systems are mechanical devices such as engines, motors and assembly lines, as well as natural processes such as weather systems. Historical data that has previously been obtained by the sensor is shown in section 31 of the graph. This data may be analysed and a prediction made of the data that will subsequently be obtained by the sensor. The second section 32 of the graph shown in FIG. 3 shows a number of different predictions of the data that could subsequently be recorded by the sensor. Each prediction may have been made by a different operation.

Other analysis that may be performed includes true/false determination, where the output of the analysis is a binary indicator. Such analysis produces additional numerical results such as a quality factor indicator or other value of interest to describe the primary result.

Figure 4:
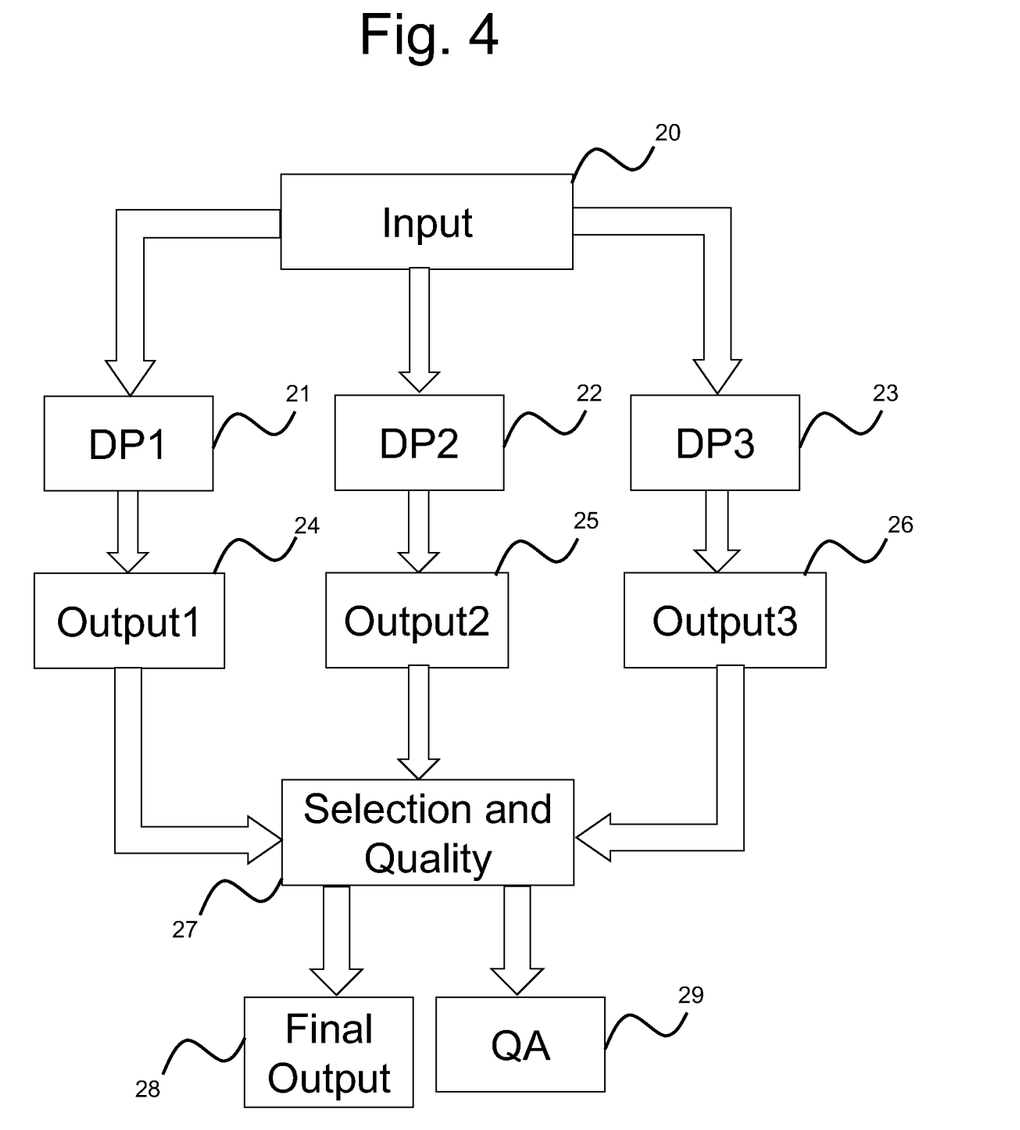
FIG. 4 is an example data processing system.

FIG. 4 illustrates in schematic form an example of a data processing system that may be used to perform analysis or interpretation of data sets, for example the segmentation of images or sensor data as above. Data sets are supplied to input 20 and then processed by different data processors DP1, DP2 and DP3 (three are illustrated but two or four or more may be used). Each of the data processors provides a respective output 24, 25, 26, which may in general be different or the same. The selector 27 provides a final output 28 based on the separate outputs, together with a predicted accuracy QA 29. The way in which the selector 27 provides the final output and the predicted accuracy will now be described in more detail.

The data processors 21, 22, 23 differ from each other so as to provide independent analyses or interpretations of the input data. For example, they may be of the same general type, e.g. neural networks, with different hyper-parameters, or different parameters, or both, or trained on different training sets, or they may be of different general types, e.g. combining data processors using machine learning with others that do not, such as algorithmic, statistical and/or heuristic rules, and/or any hybrids of these.

In order to allow a final output 28 to be produced from the separate individual outputs 24, 25 and 26, a predicted accuracy for each of the separate outputs is calculated. In this example this is calculated using a relationship obtained by means of a training data set for which there is ground truth—i.e. the correct answer is known. To calculate this relationship the training data is input to the data processors which calculate their outputs, and then a similarity measure is obtained between each output and the ground truth, and similarity measures are obtained between each of the separate outputs. The predicted accuracy may be determined by deriving a relationship between the degree of similarity of each output 24, 25, 26 to the others of the outputs 24, 25, 26 and the degree of similarity between that output and the ground truth. The relationship may be, for example, a linear regression model or a classification model. In the case where the relationship is a classification model, the classification model may be used to select which of the degrees of similarity are included in the determination of the predicted accuracy.

In the course of analysing data for which ground truth is not known, the mutual similarities between the different outputs 24, 25, 26 can be input to the derived relationship to obtain an estimate of what the similarity of each output to ground truth would be, i.e. a predicted accuracy. The predicted accuracy may be used by the selector 27 to produce the final output. It may simply select the output with the best predicted accuracy, or may form a combination with weights based on the predicted accuracy. The predicted accuracy of the selected output 28 may also be output as a quality measure 29.

It may be that for a particular type of input data, one output or a set combination of outputs consistently has the best predicted accuracy. In this case a data processing system for analysing that type of data may be provided consisting of just that or those data processors needed to provide that output, without providing the means to compare different outputs each type and select the best.

Figure 5:
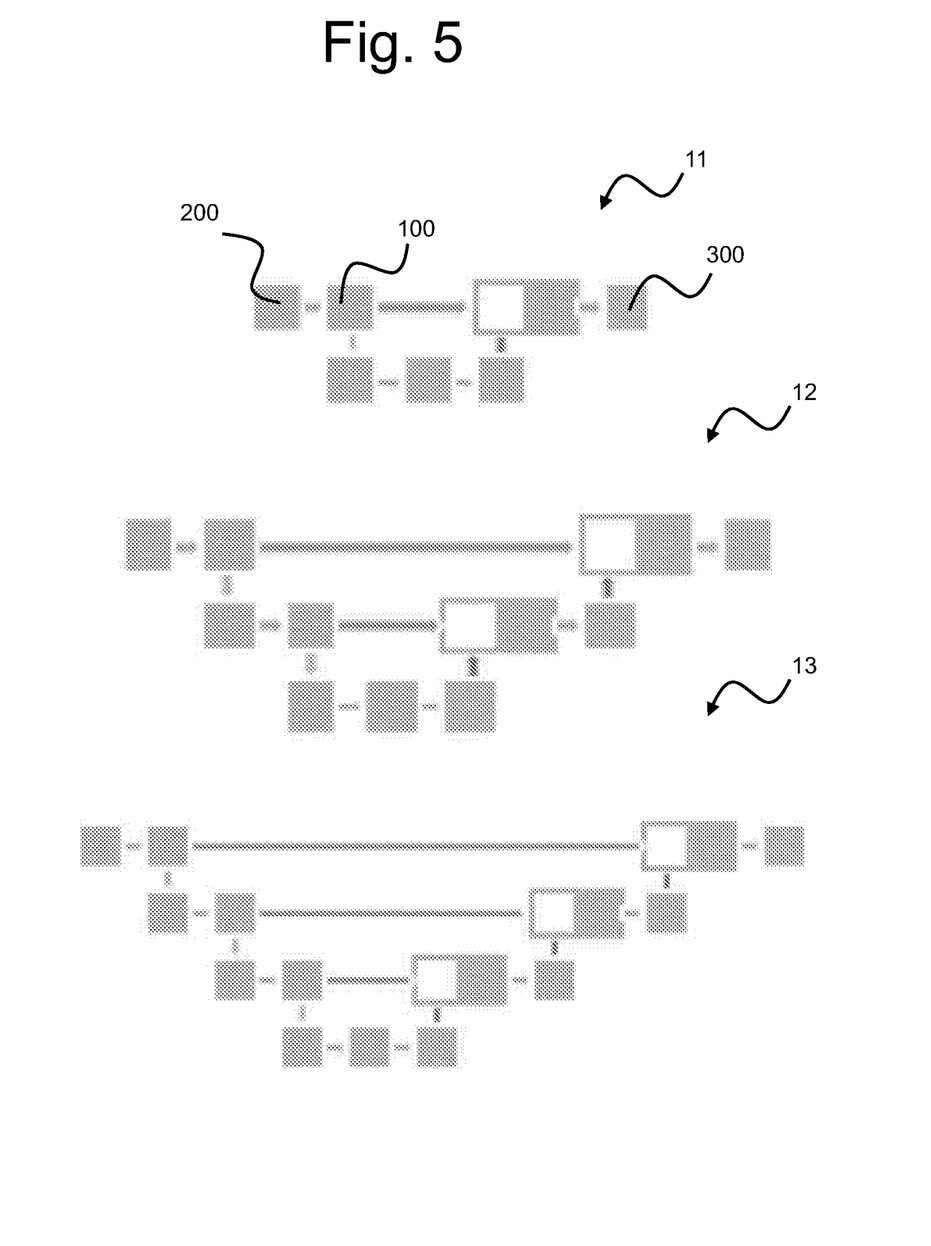
FIG. 5 is an example of a structure of a number of neural networks.

A more specific example of a data analysis system using machine learning or artificial intelligence as the data processors is shown in FIG. 5. This may be used in an image segmentation task as mentioned above. This system is based on the U-net architecture disclosed in "U-Net: Convolutional Networks for Biomedical Image Segmentation" by O. Ronneberger et al. (arXiv:1505.04597v1 [cs.CV] 18 May 2015) which is hereby incorporated by reference. In this example the system comprises a plurality of neural networks 11, 12, 13 which operate in parallel. A neural network is an example of a data processing operation that accepts an input, performs a number of calculations on the input and finally outputs an output based on the operations performed. Each neural network 11, 12, 13 may be arranged in a number of layers 100, 200, 300, each of which comprises a plurality of nodes at which a mathematical operation is performed on the data. A first layer 200 receives the input data. Each of the nodes in the first layer 200 may perform an operation on the input, typically involving forming a weighted combination of the input data, and pass the output of this operation to one or more nodes in a second layer 100. A particular weighting may be applied to the output provided to each of the nodes in the next layer. This process may be repeated by the nodes in the subsequent layer and repeated throughout a further number of layers until an output layer 300 of nodes is reached, from which the output of the network is obtained.

The parameters of the neural network 11, such as the parameter values of the operation performed by each of the nodes and the weightings used by different nodes may be optimised by training of the neural network 11 on a training data set. The neural network 11 is provided with each of the examples of the training data set and produces an output. The output of the network is compared against an ideal output for each example of the training data to determine the accuracy of the output of the neural network. The ideal output is typically ground truth, for example the result of a gold standard, e.g. human, analysis of the input data. The parameters of the neural network may then be varied and the process repeated. By repeating this process a large number of times and optimising the parameters of the network to improve the accuracy of the output compared to the ideal output, the network can be trained to improve the quality and/or accuracy of the output.

It can be seen that, during this training the parameters of the network are changed but the structure of the network, such as the arrangement of the nodes, is not. For example, the number of nodes or the number of layers in the network may not change during the training process.

Different neural networks 11, 12, 13 may have different number of nodes and layers. Neural networks may further comprise skip connections in which the output of a node or group of nodes skips at least one layer of the network. The skip connections present may also vary between different networks. FIG. 5 shows a number of different neural networks with different numbers of layers and/or skip connections. In the example shown in FIG. 4, the first neural network 11 has seven layers and one skip connection, the second neural network 12 has eleven layers and two skip connections and the third neural network 13 has fifteen layers and three skip connections. The number of layers and/or the number of skip connections may have been predetermined for the neural network prior to the training of the network. The number of layers and skip connections may be considered hyper-parameters of the neural network.

One approach of defining the complexity of a neural network is to consider the number of layers. For example, a neural network with a small number of layers may be considered simpler than a neural network with a large number of layers. In the example shown in FIG. 4, the first neural network 11 may be considered simpler than the second 12 and third 13 neural networks. This may be because each layer of the network may be associated with a certain scale of the input data. For example, in the case of an image, each layer of the network may be associated with different scales of features within the image. A neural network with a larger number of layers may therefore analyse the image on an increased variety of scales and the output of the network would therefore be dependent on more features within the image. FIG. 4 shows an examples of neural networks 11, 12, 13 of increasing numbers of layers.

Further variation may be achieved by modifying the training parameters, such as optimisation, methods, cost functions, iterations or simply using different data or data in different order for the training process. All these factors have an impact on the process performed by the resulting network.

It should be noted that a more complex network or a network trained on larger datasets, may not necessarily be associated with the most accurate output when performing an analysis of data. For example, more complex networks may be more prone to overfitting of the training data, which may result in the network producing less accurate outputs when used. Large data sets may for example suffer veracity problems, and are more likely than small data sets to contain irrelevant or plainly corrupt ground truth data with unpredictable impacts on the resulting network.

The neural network may be a convolutional neural network. Convolutional neural networks may be particularly suitable for use when the data is image data. In a convolutional neural network, filters may be applied to the data within a layer to modify the scale of the data. The size of the filter, the number of filters applied and the method of operation of the filter may be considered hyper-parameters of the convolutional neural network.

Figure 6:
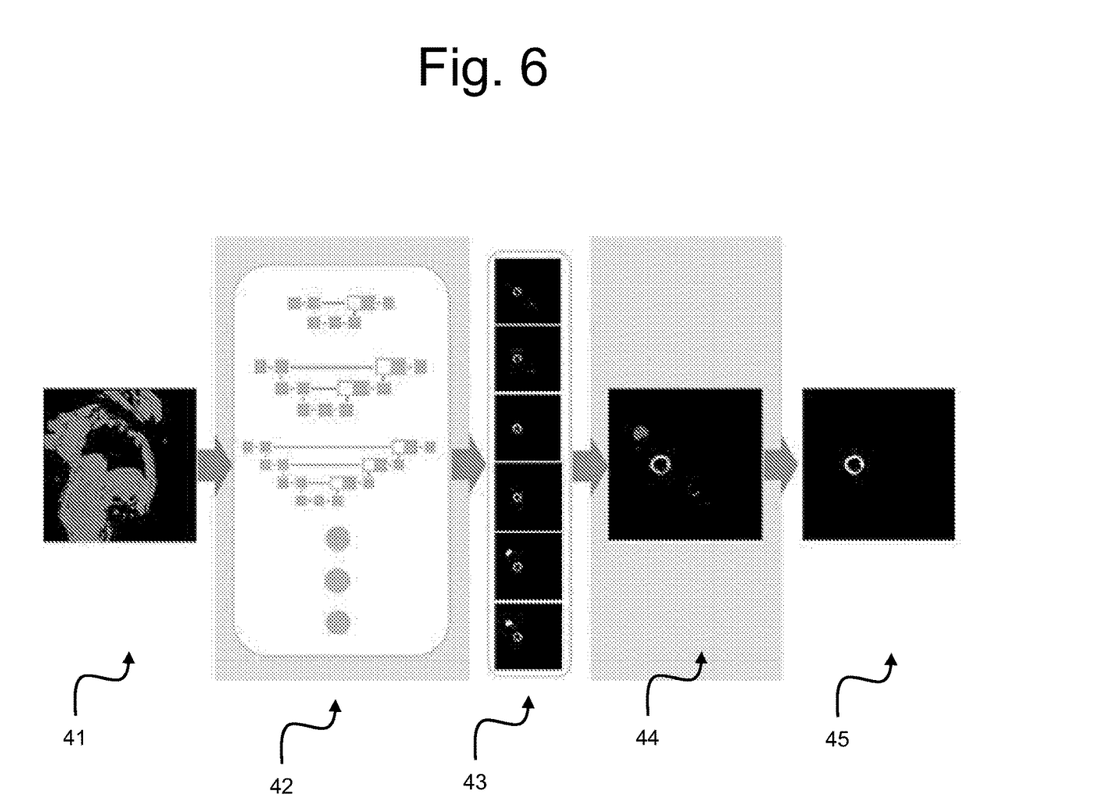
FIG. 6 is a flow diagram illustrating a set of processing steps for segmenting an image.

The output of a number of different data processing operations may be combined to obtain a combined output. An example of this process is shown in FIG. 6. In a first step 41, an initial piece of data for analysis is obtained through some form of sensing. In the example shown in FIG. 4, a quantitative magnetic resonance T1 map of the heart has been obtained.

In a second step 42, the data is provided to a plurality of different data processing operations for analysis. In the example shown in FIG. 6, three processing operations are shown, each being a neural network. Three further processing operations are used, but are not shown. The data may be provided to each of the different data processing operations separately. The different data processing operations may not interact, in that the different data processing operations do not receive an input from or send an output to any of the other data processing operations during the analysis of the data. In the example shown in FIG. 6, each of the neural networks has a different set of hyper-parameters (e.g. number of layers and skip connections, structure of the neural networks), or variations in other parameters as discussed above. In the case where the different data processing operations are neural networks, at least two of the plurality of neural networks may have been trained on the same training data set. Furthermore, all of the plurality of neural networks may have been trained on the same training data set.

In a third step 43, each of the operation units outputs a result. In the example shown in FIG. 6, each result is a candidate segmentation of the magnetic resonance image which isolates a particular feature within the image, in this case the left ventricular myocardium, by classifying each pixel as belonging to that feature or not. In the example shown in FIG. 6, it can be seen that not all of the outputs are the same. In particular, the fifth and the sixth outputs visually differ from the other outputs in that a further feature has been segmented in the image.

In a fourth step 44, the outputs may be combined to form a combined output. In the example of image data, the images may be added to produce such a combined image. Another method of combing the outputs of the different functions is to multiply the outputs to form the combined output. A further method of combining the outputs is to form an agreement map. An agreement map may be determined by comparing a selected pixel in at least two of the outputs and classifying the corresponding pixel of the agreement map as being part of the segmented feature when a pre-determined threshold of the at least two outputs also classify the selected pixel as part of the segmented feature. For example the predetermined threshold may be set at three. When applied to the example shown in FIG. 6, this means that a pixel is determined to be part of the segmented feature if at least 3 of the 6 outputs indicate that the corresponding pixel is part of the segmented feature. In principle, the combined output may be produced by any mathematical or logical operation, including arbitrary or empirical weighting of the individual outputs shown in the step 43, also including further artificial intelligence solutions. Above the optimisation of the individual operations, the process of deriving the combined output can also be optimised in order to achieve the overall best result, as discussed in greater detail below.

In the example shown in FIG. 6, each of the neural networks produces a separate output. The agreement map may be considered a combined output. This is because it combines information from least two of the candidate, or intermediate, segmentations to produce a combined output. Such a combined output may include any number of the separate outputs to form the combined output. For example, the combined output may be an agreement map based on any number of the separate outputs. A plurality of combined outputs may be calculated, wherein each of the plurality of combined outputs is based on a different combination of separate outputs.

In a fifth step 45, one of the plurality of separate outputs or the, or one of the, combined outputs may be selected as a final output of the analysis. The final output may be determined by selecting the output which has the highest predicted accuracy from the separate outputs that have been output by the operations and the combined outputs based on the separate outputs. If the highest predicted accuracy is not acceptable, for example because the accuracy is too low, the process may be repeated with further data processing operations that are different to the data processing operations already included. More than one output may be selected and output as multiple final outputs.

The predicted accuracy of the output may be calculated by determining a degree of similarity between at least two of the set of outputs including the separate and combined outputs. The degree of similarity may be calculated by any method that is suitable for calculating a difference between two sets of data, such as the range or standard deviation of the at least two outputs. The degree of similarity may be obtained using the Dice similarity coefficient (DSC), which is defined by the following equation.

$$DSC = \frac{2|X \cap Y|}{|X| + |Y|}$$

Where $|X \cap Y|$ is the number of elements common to sets X and Y, and $|X|$ and $|Y|$ are the number of elements in each set respectively. In the example of a segmented image, the DSC is calculated based on each pixel of each of the segmented image and corresponding pixels with the same segmented value are defined as common elements.

For each of the set of outputs, the degree of similarity between that output and the other outputs may be calculated. The predicted accuracy of that output may then be determined based on the degrees of similarity. The predicted accuracy may be determined by a use of a relationship obtained in the training process, which relates the degree of similarity between each output and the other outputs to the degree of similarity between that output and the ideal output (e.g. ground truth). Thus following the process of training the neural networks, for each of the data sets in the training set, the similarity between the output and ground truth can be calculated, and then a relationship is derived between these similarities and the mutual similarities between the different outputs. The relationship may be, for example, a linear regression model. In the course of analysing data for which ground truth is not known, the mutual similarities between the different outputs can be input to the derived relationship to obtain an estimate of what the similarity of each output to ground truth would be.

For example, using DSC as the similarity measure, the predicted accuracy may be calculated using the following equation:

$$DSC_m^{predicted} = R_m(i) = \alpha_m + \sum_{x \in DSC^{inter}(i)} \beta_m^x \cdot x$$

Where $\alpha_m$ and $\beta_m$ are parameters of the linear regression model $R_m$ for a particular output m, and $DSC^{inter}(i)$ is the DSC between two of the outputs. The predicted accuracy of the output can therefore be calculated from the sum of the degrees of similarities obtained between the different outputs and the values of the regression coefficients.

The values for the regression coefficients may be obtained by a training process for each linear regression model $R_m$ by minimizing the mean squared error loss function $L_m$:

$$L_m = \frac{1}{|\text{train}|} \sum_{i \in \text{train}} (R_m(i) - DSC_m^{real}(i))^2$$

Where train is a data set of training data and the real DSC has been determined with reference to ground truth (for example a manual segmentation of an image). The training of the regression model may be performed using data of the same type of data to be subsequently analysed by the system. For example, in the case of segmentation of images including the left ventricular myocardium, the training of the regression model described above may also be performed on images including the left ventricular myocardium.

Figure 7:
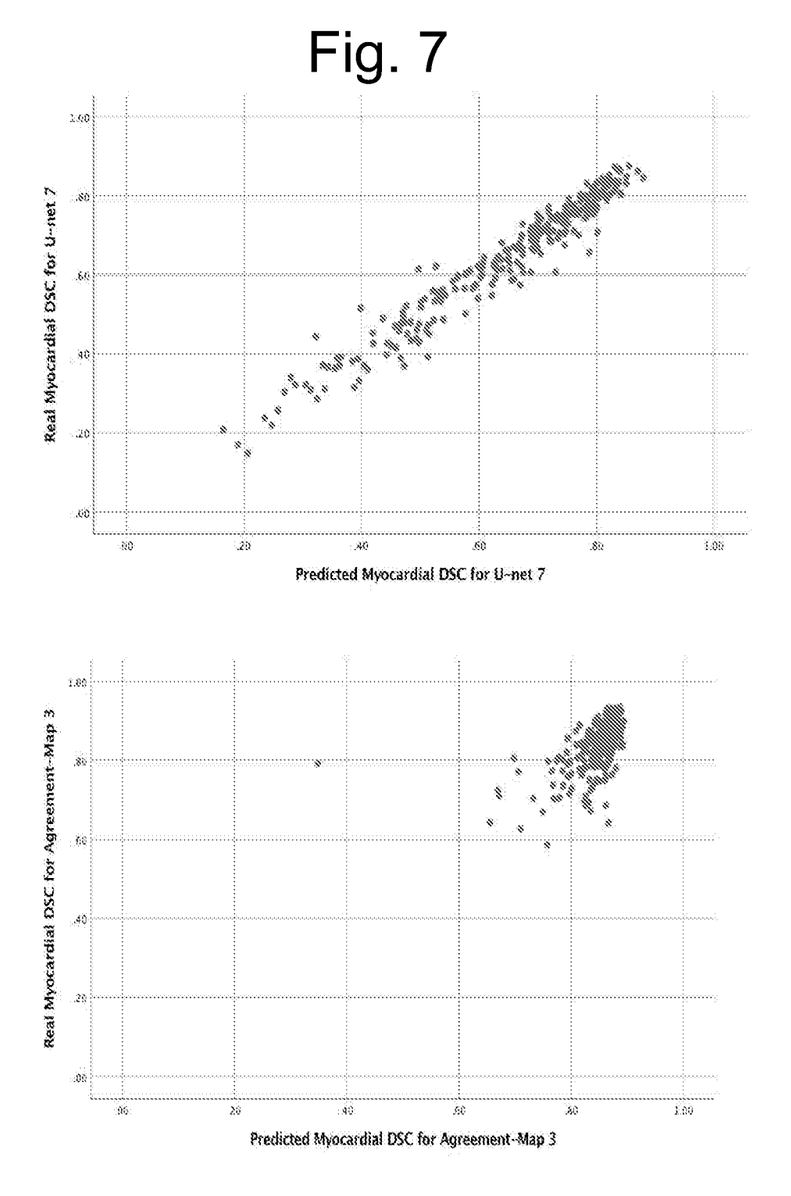
FIG. 7 is a scatter plot of predicted similarity versus actual similarity for a set of analysed test data.

An example result of performing the above process is shown in FIG. 7, which is a plot of predicted DSC versus real DSC for various images. The plot demonstrates that individual operation components produce different value in (top panel) maximizing the spread of DSC predictions such as to quantify the quality of original data and (bottom panel) maximise the segmentation accuracy. To demonstrate this principle, images were used for human left-ventricular short axis slices in T1 mapping. Corresponding contours were manually segmented by cardiologists to produce the ground truth. Endocardial and epicardial contours were provided. The data was randomly split into 80% training data, 9% validation data, and 11% testing data.

Six independent fully convolutional neural networks were then provided for left ventricular myocardium segmentation. Each network varied in hyper-parameters such as the number of convolutional layers and the number of skip connections. The smallest neural network implemented had only seven convolutional and transposed convolutional layers, and one skip connection, while the largest network had 27 layers and 6 skip connections.

The networks were independently trained to provide a segmented output of an image using the training data and the training was validated using the validation data. The regression coefficients $\alpha_m$ and $\beta_m$ described above were then obtained using the method as described above based on the training data.

The trained networks and regression model were then used to analyse the test data and predict the accuracy of the outputs. In the graphs shown in FIG. 7, it can be seen that there is a strong linear relationship between the predicted and actual DSC for various images as analysed by the network with seven layers in the top graph, and an agreement map using the input of all six networks with a threshold of agreement of at least three outputs as shown in the bottom graph. The method as described above may be used to predict the accuracy of an output based on the predicted DSC as discussed above. In particular, the regression model improves the accuracy of the prediction.

Figure 8:
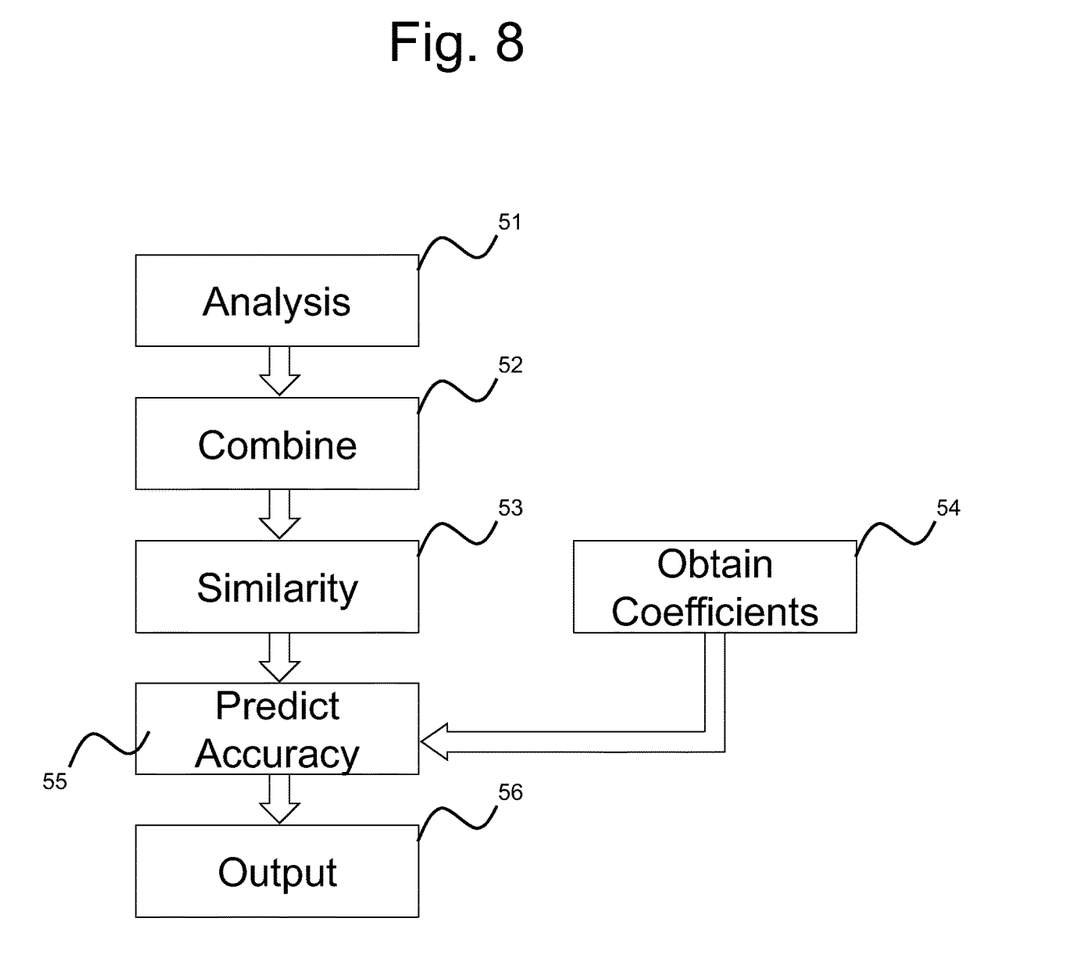
FIG. 8 is a flow chart illustrating a set of process steps for analysing an image.

The processing steps to arrive at a selected output are set out in FIG. 8. In a first step 51, the analysis of input data is performed with each data processing operation to produce an output. In a second step 52, combinations of the outputs may be obtained, and in a third step 53, the degree of similarity between each of the outputs may be calculated as discussed above.

In an additional step 54, the regression coefficients discussed above may be obtained using test data. The regression coefficients and degrees of similarity may then be combined in a fifth step 55 to predict the accuracy of each output.

Finally, in a sixth step 56, the result with the highest predicted accuracy may be selected as the output of the system. The output with the highest accuracy may therefore be determined. In the case where more than one output is determined to have the same highest predicted accuracies, one of the outputs may be selected as the output of the system. For example, the output which requires less processing to be performed may be selected as the output of the system. Alternatively, several or all of the outputs may be selected as the output of the system.

The processing steps described above may only need to be performed once. For example, the processing steps above may be performed using an initial data set and the operation associated with the output with the highest accuracy may be determined. Further data may then subsequently be analysed using the selected operation, without the processing steps described above needing to be repeated This approach may reduce the processing time required to analyse further data.

Alternatively, at least some of the processing steps may be used or performed again when further data is analysed. For example, each of the first 41, second 42, third 43, fifth 45 and sixth 46 step may be performed each time further data is analysed. The operation which produces the highest predicted accuracy of output may therefore be dynamically determined each time further data is analysed and the output of that operation may be used to analyse the further data. This approach may increase the accuracy of the output. The reselection of the operation to be used may be performed each time further data is analysed.

Figure 9:
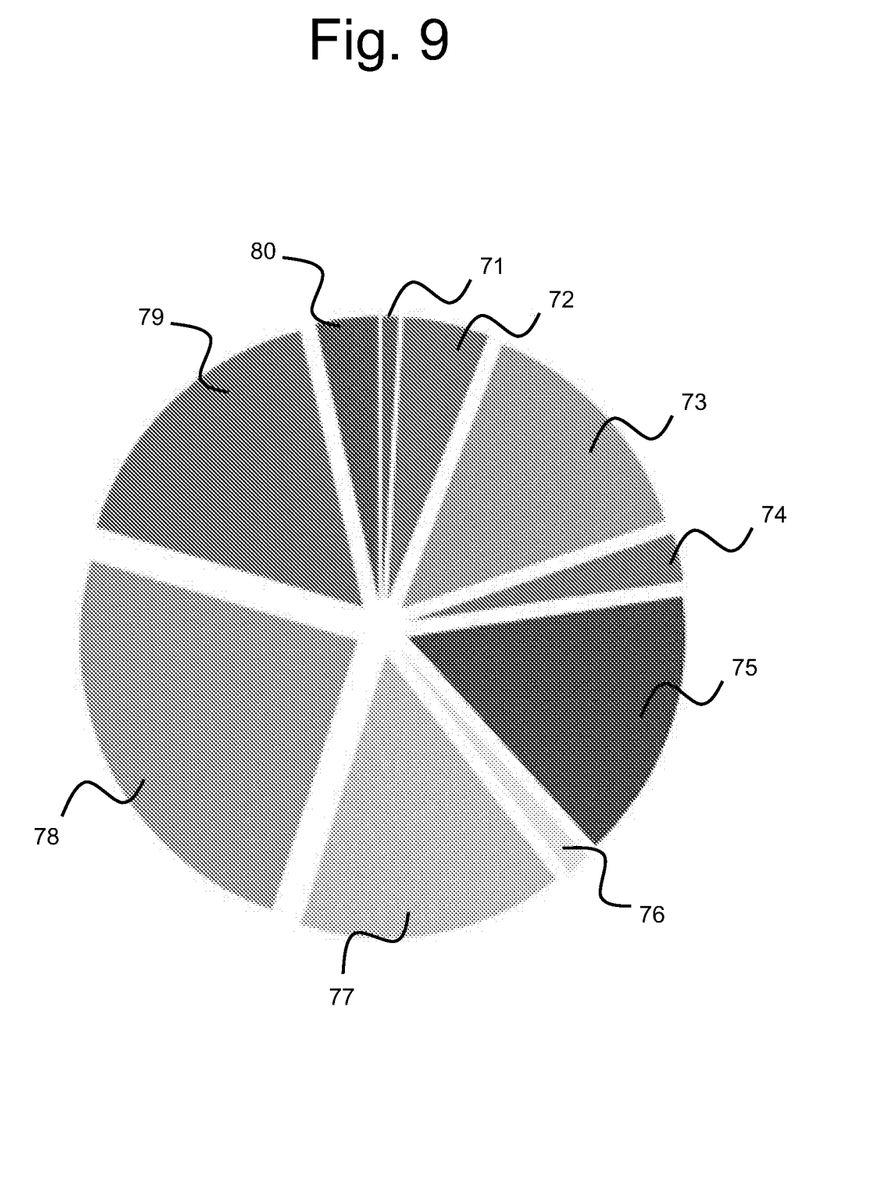
FIG. 9 is a chart illustrating the proportions of different operations that may be selected in a dynamic process.

FIG. 9 illustrates an example of the selection of different operations for multiple instances of further data which is analysed. After training, further data was analysed separately using six different independent neural networks with 7, 11, 15, 19, 23 and 27 layers respectively. FIG. 9 shows the proportions for which each of the separate networks were selected as the operation with the highest predicted accuracy of output. Sections 71, 72, 73, 74 and 75 correspond to the output of the network with 11, 15, 19, 23 and 27 layers being selected as the operation with the highest predicted accuracy of output. The network with 7 layers was never selected as the operation with the highest predicted accuracy of output. Sections 76, 77, 78, 79 and 80 correspond to the combined output of at least 1, 2, 3, 4 or 5 of the individual networks being selected as the combined operation with the highest predicted accuracy of output. It can therefore be seen that different potential operations may be selected as the operation with the highest predicted accuracy of output leading the accuracy of the selection of the operation in the dynamic process being increased.

The method may further include the step of outputting a warning or performing an action in the case where the predicted accuracy of the output with the highest predicted output falls below a predetermined value. The warning may indicate to an operator that the predicted accuracy has dropped below the predetermined value so that, for example, manual analysis of the data can be performed. In the case of analysis of data including images obtained from a vehicle, the action may be to alert the driver and/or stop the vehicle The predetermined value may have been set based on the acceptable margin of error for the output.

Figure 10:
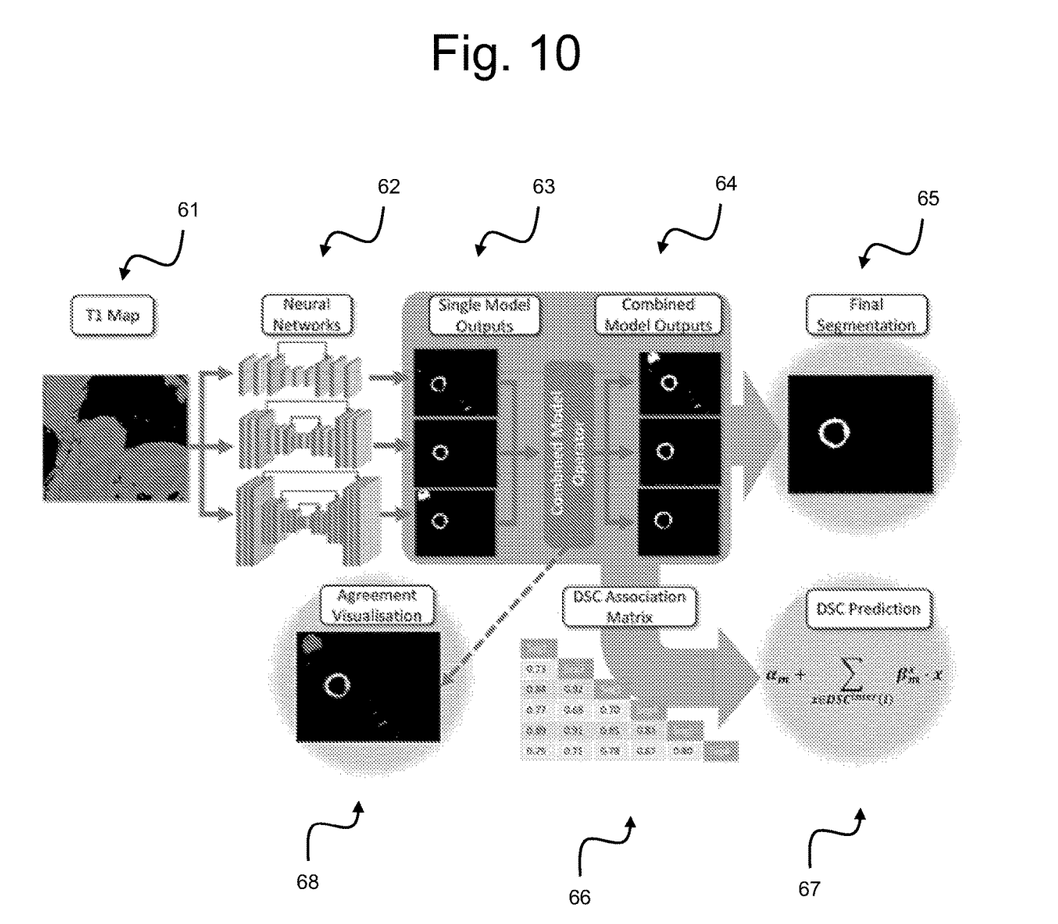
FIG. 10 is a schematic example of analysis of an image using multiple neural networks.

FIG. 10 shows an overview of one application example compromising a multiple neural network framework for integrated segmentation and quality control of a T1 map. For simplicity, FIG. 10 shows an example using three single independent neural networks. A T1 map is provided in a first step 61. The T1 map is analysed independently by the three single segmentation models (the three independent neural networks) to output single-model segmentations in second and third steps 62,63. In a fourth step 64, the single-model segmentations are used to generate further combined-model segmentations, for example according to the degree of consensus by generating an agreement map as discussed above. In a fifth step 65, one segmentation model with the chosen best segmentation, for example, the most accurate, is chosen as the final output. In a comparison step 66, an association matrix is generated. The association matrix may include, for example, Dice Similarity Coefficients (DSC) of all pairings of segmentations, as a continuous measure of consent between intermediate models. The association matrix can be used to predict the overall quality and/or accuracy of the final segmentation as discussed above in a prediction step 67. Other measures of agreement or disagreement can be also obtained.

In a further visualisation step 68, the agreement between different single-model segmentations can be visualised. For example, a colour coded heat map may be generated indicating the agreement between the chosen best segmentation model and the other single-model segmentations may be generated. Alternatively, the visualization may indicate the degree of agreement between all of the models. Such a visualisation may aide in the understanding of the selection of the final output of the process.

The method as described above may be carried out on an analysis device. However, any step of the method may be performed on a separate device and the results sent to a further device for further analysis. For example, the step 54 of calculating the regression coefficients from training data may be performed separately and the regression coefficients may be stored on the analysis device. The analysis device may then perform the other steps as discussed above using the predetermined regression coefficients to analyse the data, determine the predicted accuracy of each output and select the output with the highest predicted accuracy. This may mean that less processing power is required by the analysis device.

The invention claimed is:

1. A computer-implemented method of selecting an operation for analysis of data stored in a memory, the method comprising, by at least one processor:
processing the data using at least two operations, wherein each of the at least two operations are different, to obtain a set of outputs including the output associated with each operation;
determining an output from the set of outputs with the highest predicted accuracy; and
selecting the operation associated with the determined output for further analysis of data;
wherein the determination of the output with the highest predicted accuracy comprises:
selecting at least two outputs from the set of outputs, each of the at least two outputs associated with a different operation;
calculating a degree of similarity between each of the at least two selected outputs and another output of the set of outputs;
using the degree of similarity for each of the at least two selected outputs to predict the accuracy of each of the at least two selected outputs based on a relationship between the similarity of the outputs and the accuracy of the outputs, the relationship being a data-processing model derived from an analysis of the degrees of similarity between the outputs of the different operations on training data including ground truth and the accuracy of each output compared to the ground truth, wherein the predicting of the accuracy of each of the at least two selected outputs comprises inputting the degree of similarity for each of the at least two selected outputs into the derived relationship to obtain a predicted accuracy of each output, the predicted accuracy being a prediction of the similarity of each output to ground truth; and
determining the output with the highest predicted accuracy of the at least two selected outputs.

2. The method of claim 1, further comprising obtaining a combined output by combining at least two of the outputs associated with each operation;
wherein the combined output is additionally included in the set of outputs.

3. The method of claim 1, wherein the relationship is a regression or classification model obtained by comparing the degree of similarity of the selected output and the other output of the set of outputs obtained for the set of training data to the degree of similarity of the selected output and ground truth of the training data.

4. The method of claim 1, wherein the degree of similarity is obtained using a Dice similarity coefficient.

5. The method of claim 1, wherein the difference between each of the at least two operations is predetermined.

6. The method of claim 1, wherein at least one of the at least two operations has been optimised for analysis of an image.

7. The method of claim 1, wherein at least one of the at least two operations is performed by a fully convolutional neural network.

8. The method of claim 1, wherein at least two of the at least two operations are performed by neural networks and the neural networks differ by at least one of: their number of layers, number of parameters, their parameters (including weights), their hyper-parameters, the data used to train them.

9. The method according to claim 1, further comprising analysing further data using the selected operation.

10. The method of claim 9, further comprising obtaining a combined output by combining at least two of the outputs associated with each operation;
wherein the combined output is additionally included in the set of outputs,
wherein when the output with the highest predicted accuracy is a combined output, the selected operation is a combination of the set of operations associated with the combined output.

11. The method of claim 1, further comprising analysing further data, wherein the method of claim 1 is performed on the further data to determine a further selected operation and the further data is analysed using the further selected operation.

12. The method of claim 11, further comprising obtaining a combined output by combining at least two of the outputs associated with each operation;
wherein the combined output is additionally included in the set of outputs,
wherein when the output with the highest predicted accuracy is a combined output, the further selected operation is a combination of the set of operations associated with the combined output.

13. The method of claim 1, wherein the data is in the form of an image.

14. The method of claim 13, wherein the output of each operation is a segmentation of the image.

15. The method of claim 13, further comprising obtaining a combined output by combining at least two of the outputs associated with each operation;
wherein the combined output is additionally included in the set of outputs,
wherein for the combined output, segmentation of each pixel of the image is determined depending on the agreement of, for the respective pixel, a threshold number of the outputs comprising the combined output.

16. The method of claim 13, wherein the analysis determines the shape of a section of a human body recorded in the image.

17. The method of claim 16, wherein the section of the human body is the left ventricular myocardium.

18. The method according to claim 1, further comprising alerting an operator if the highest predicted accuracy drops below a predetermined threshold.

19. An analysis device, comprising:
an analyser configured to perform the method of claim 1.

20. A non-transitory computer readable medium comprising code that, when executed by a computer system, instructs the computer system to perform the method of claim 1.

21. A computer system for selecting an operation for analysis of data, the system comprising at least one processor and memory, the memory storing code that perform the method of claim 1.

* * * * *